United States Patent

[11] 3,579,119

[72] Inventors Sik-Sang Yau;
Calvin K. Tang, Evanston, Ill.
[21] Appl. No. 724,701
[22] Filed Apr. 29, 1968
[45] Patented May 18, 1971
[73] Assignee Northwestern University
Evanston, Ill.

[54] UNIVERSAL LOGIC CIRCUITRY HAVING MODULES WITH MINIMUM INPUT-OUTPUT CONNECTIONS AND MINIMUM LOGIC GATES
21 Claims, 13 Drawing Figs.

[52] U.S. Cl. .......... 328/92, 307/203, 307/207, 328/93
[51] Int. Cl. .......... H03k 19/00, H03k 19/12, H03k 19/20
[50] Field of Search .......... 307/203, 207; 328/92–6, 158; 235/150.53

[56] References Cited

UNITED STATES PATENTS 3,090,943 5/1963 Lewis .......... 328/92X

*Primary Examiner*—Donald D. Forrer
*Assistant Examiner*—John Zazworsky
*Attorney*—Johnson, Dienner, Emrich, Verbeck & Wagner

ABSTRACT: Universal logic circuitry for a large number of variables using identical universal logic circuits of a small number of variables having a minimal number of logic gates and input-output circuits as modules in a multilevel arrangement.

INVENTORS
SIK-SANG YAU
CALVIN K. TANG
BY
Brown Jackson Boettcher & Dienner
ATTYS.

INVENTORS
SIK-SANG YAU
CALVIN K. TANG
BY *[signature]*
ATTYS.

INVENTORS.
SIK-SANG YAU
CALVIN K. TANG

BY
[signature]
ATTYS.

INVENTORS.
SIK-SANG YAU
CALVIN K. TANG
BY
Brown, Jackson, Boettcher & Dienner
ATTYS.

INVENTORS
SIK-SANG YAU
CALVIN K. TANG
BY
ATTYS.

INVENTORS.
SIK-SANG YAU
CALVIN K. TANG
BY
Brown Jackson Boettcher & Dienner
ATTYS.

INVENTORS.
SIK-SANG YAU
CALVIN K. TANG
BY Barry Jackson Brother & [illegible]
ATTYS.

UNIVERSAL LOGIC CIRCUITRY HAVING MODULES WITH MINIMUM INPUT-OUTPUT CONNECTIONS AND MINIMUM LOGIC GATES

FIELD OF THE INVENTION

Universal logic circuits which are used to realize logic functions for three, four and more variables; the circuits may have different fan-in limitations and may be used to provide larger universal logic circuits (ULC) of a more complex, economical and reliable structure, or as a building block for realizing arbitrary functions. In addition, the invention is directed to an arrangement which uses an error correction code to improve the reliability of a ULC.

DESCRIPTION OF PRIOR ART

In order to achieve a significant economic advantage in utilizing integrated circuits in computer circuitry, it is desirable and necessary to provide a circuit which can provide any logic function of a fixed number of variables by simply varying its input terminal connections. Such a circuit is called a universal logic circuit (ULC). When the number of variables becomes large, a ULC may be too complex to be economically included in a single package. As a solution to such problem a number of ULC's of a small number of variables are used as the modules to build a ULC of a large number of variables. The modules of a small number of variables are called universal logic modules (ULM's).

The problem of designing a ULC was first treated by D. C. Forslund and R. Waxman, "The Universal Logic Block (ULB) and Its Application To Logic Design," IEEE Publication 16C40 pp. 236—250, and later by J. T. Ellison et al. "Universal Function Modules," UNIVAC Tech. Report, Contract No. AF-19-28-6012, DDCAD-655395 Apr. 1967, and by B. Elspas et al., "Properties of Cellular Arrays For Logic and Storage," Stanford Research Institute Scientific Report 3, Contract No. AF-19-628-5828, DDC AD-65883 June 1967. Such arrangements employed the concept of equivalence classes to reduce the number of all possible logic functions of a given number of variables to the number of the equivalence classes. An equivalence class is a set of logic functions that may be obtained from a particular network by only manipulating the application of variables to the input terminals of the network. One of the most common constraints on these manipulations is that only true variables are available with the permutation of the variables at the input terminals permitted. With this restriction, L. Hellerman "A Catalogue of Three-Variables OR-INVERT and AND-INVERT Logical Circuit" IEEE Transaction on Electronic Computers Vol. 12, pp. 198—223, 1963 partitioned the $2^{2}=256$ three-variable logic functions into 80 equivalence classes. In order to reduce the number of equivalence classes, Forslund and Waxman assumed that both true and complement variables are available at the input, and true and complement logic functions are both available at the output (two output terminals). In addition, biasing (to a logical 1 or 0) and duplication of input variables to the input terminals are also permitted. The equivalence classes defined this way reduces its number from 80 to 10 for three-variable logic functions.

SUMMARY OF THE INVENTION

It is an object of the present invention to provide universal logic circuits which may be used to realize logic functions for three, four and more variables, or as a building block for realizing more complex, larger arbitrary functions.

It is another object of the present invention to provide a universal logic circuit of a minimal number of gates and a minimal number of input-output pins for use in providing universal logic circuits of a large number of variables.

It is a further object of the invention to provide a universal logic circuit for any arbitrary three-variable logic function by a basic circuit which has only seven gates, and only seven input-output pins. In one embodiment, in realizing the logic function of three variables $x_1, x_2, x_3$, five gates (without inverters) provide the desired output functions. Briefly, the circuit is arranged to provide the logic function $f(x_1, x_2, x_3)$ of three variables $x_1, x_2, x_3$ by connecting the variables over the input terminals to reflect the expansion, $$f(x_1, x_2, x_3)=\bar{x}_1\bar{x}_2 f(0,0,x_3)+\bar{x}_1 x_2 f(0,1,x_3)+x_1\bar{x}_2 f(1,0,x_3)+x_1 x_2 f(1,1,x_3)$$

where the functions $f(0,0,x_3)$, $f(0,1,x_3)$, $f(1,0,x_3)$ and $f(1,1,x_3)$ are functions of $x_3$ only, and each of these functions assumes one of the four values: $x_3$, $\bar{x}_3$, 0, or 1. In the novel three variable circuit of the invention, five logic gates are connected in two levels (not including the inverters) to realize any arbitrary three-variable logic function $f(x_1, x_2, x_3)$ by connecting two inputs of each of four gates to two of the groups $x_1$, $x_2$ and $\bar{x}_1$, $\bar{x}_2$ inputs, and the other input of each of the four gates to one of the groups of four inputs $x_3$, $\bar{x}_3$, 0, and 1 to reflect the expanded function. The fifth gate is connected to the outputs of the four gates.

It is yet another object of the invention to provide a universal logic circuit for any arbitrary four-variable logic function by a basic circuit which has only 14 gates and only 11 input-output terminals with a fan-in limitation of five or 12 gates and 12 input-output terminals with a fan-in limitation of eight.

It is a further object of the invention to provide a universal logic circuit for any arbitrary four-variable logic function by a basic circuit which has 16 gates (including inverters) and 12 input-output terminals.

In the foregoing objects in which circuits for three and four variables are described the circuits may be extended to provide a larger number of variables $n$.

It is a further object of the invention to provide a novel multilevel ULC in which the function of a large number of $n$ variables is realized by using ULM-$k$ modules in successive levels in a tree structure.

GENERAL DESCRIPTION

Figure 1:
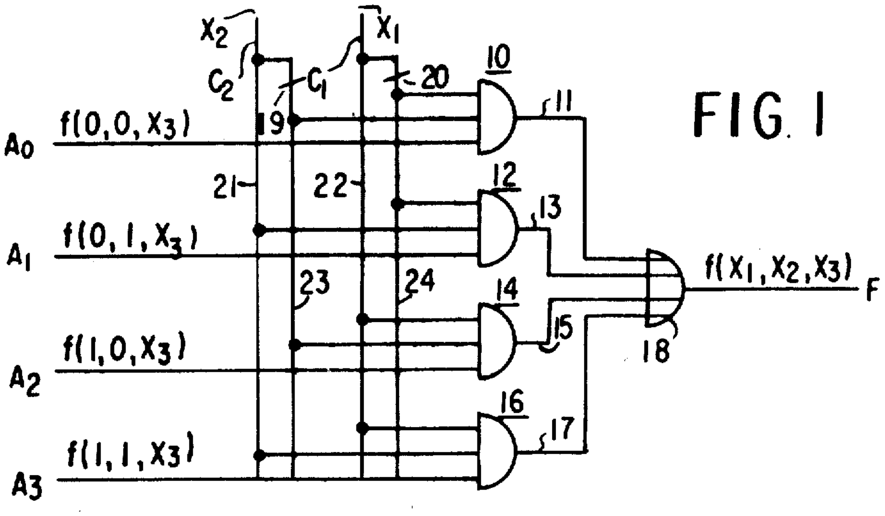
FIG. 1 is a ULC of three variables consisting of AND, OR and NOR gates.

With reference to FIG. 1, there is shown thereat an embodiment of the novel circuit for providing any arbitrary three-variable logic function $f(x_1, x_2, x_3)$. As there shown, a first input terminal $C_1$ and a second input terminal $C_2$ and input terminals $A_0$—$A_3$ are connected to the inputs for four logic gates 10, 12, 14 and 16 respectively. The outputs 11, 13, 15, 17 of gates 10, 12, 14, 16 are connected over an OR gate 18 to provide the function output $f(x_1, x_2, x_3)$ over the output terminal F.

Input terminals $C_2$, $C_1$ extend $x_1$, $x_2$ inputs via conductors 21, 22 and are also connected over inverters 19, 20 to provide $\bar{x}_1$, $\bar{x}_2$ inputs over conductors 23, 24. Gate 10 has its three inputs connected to conductors 24, 23 ($\bar{x}_1, \bar{x}_2$) and $A_0$ to provide the function $\bar{x}_1 \bar{x}_2 f(0, 0, x_3)$ at its output 11. Gate 12 has its three inputs connected to conductors 24, 21 ($\bar{x}_1, x_2$) and $A_1$ to provide the function $\bar{x}_1 x_2 f(0, 1, x_3)$ at its output 13. Gate 14 has its inputs connected to conductors 22, 23 ($x_1, \bar{x}_2$) and $A_2$ to provide the function $x_1 \bar{x}_2 F(1, 0, x_3)$ at its output 15, and gate 16 has its input connected to conductors 21, 22 ($x_1, x_2$) and $A_3$ to provide the function $x_1 x_2 f(1, 1, x_3)$ at its output 17.

By way of example, it will be assumed that the circuit of FIG. 1 is to be used to provide the function $f(x_1 x_2 x_3)$ for $x_1+x_2 x_3$, such function having been selected in the first instance for the purpose of providing a simple example of the utility of the present circuit.

It will be apparent that for each of the residue functions the following inputs are required:

| | $x_1+x_2x_3$ | Output |
|---|---|---|
| $f(0,0,x_3)$ becomes | $0+(0)(x_3)=0$ | 0 |
| $f(0,1,x_3)$ becomes | $0+(1)(x_3)=x_3$ | $x_3$ |
| $f(1,0,x_3)$ becomes | $1+(0)(x_3)=1$ | 1 |
| $f(1,1,x_3)$ becomes | $1+(1)(x_3)=1+x_3$ | 1 |

To provide such outputs $A_0$ is connected to logic 0, $A_1$ is connected to logic 0, $A_2$ is connected to logic 1 and $A_3$ is connected to logic 1.

The same circuit can be used with a much more complex function as follows:

$$f(x_1, x_2, x_3)=\bar{x}_1\bar{x}_2\bar{x}_3+\bar{x}_1x_2x_3+x_1\bar{x}_3+x_1\bar{x}_2$$
$$=\bar{x}_1(x_2x_3+\bar{x}_2\bar{x}_3)+x_1(\bar{x}_2+\bar{x}_3)$$
$$f(0,0,x_3)=1\cdot(0\cdot x_3+1\cdot\bar{x}_3)+0\cdot(1+\bar{x}_3)=\bar{x}_3 \qquad A_0$$
$$f(0,1,x_3)=1\cdot(1\cdot x_3+0\cdot\bar{x}_3)+0\cdot(0+\bar{x}_3)=x_3 \qquad A_1$$
$$f(1,0,x_3)=1\cdot(0\cdot x_3+1\cdot\bar{x}_3)+1\cdot(1+\bar{x}_3)=1 \qquad A_2$$
$$f(1,1,x_3)=0\cdot(1\cdot x_3+0\cdot\bar{x}_3)+1\cdot(0+\bar{x}_3)=\bar{x}_3 \qquad A_3$$

To provide such outputs $A_0$ is connected to $\bar{x}_3$, etc.

It can be shown that the basic ULC shown can be connected to provide $f(x_1 x_2 x_3)$ for any three-variable functions by using the proper input terminal connections.

It will be apparent from the foregoing description that one novel embodiment of the three-variable ULC comprises seven gates including two inverters in the input circuit, four logic gates, and a gate in the output circuit. If the circuit shown in FIG. 1 is to be a minimum gate circuit, inverters 19, 20 may be omitted and two extra input pins $\bar{x}_1$, $\bar{x}_2$ may be provided.

It is further apparent that the two level AND and OR circuits can be replaced by NAND gates of the same configuration. Thus inverter circuits 19, 20, AND gates 10, 12, 14 and 16, and OR gate in FIG. 1 may be replaced by NAND gates to provide a like mode of operation while yet standardizing on the gates to be used.

Figure 11:
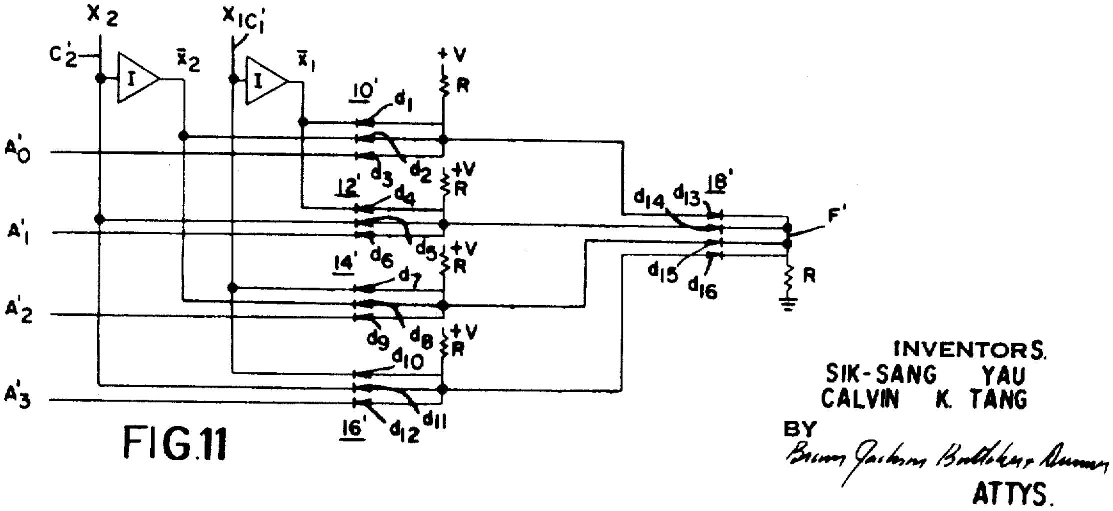
FIG. 11 is a ULC of three variables implemented with diode resistor logic elements.

In the embodiment of the ULC shown in FIG. 1 as well as in the NAND gate configuration described, the basic circuit in one example may comprise 16 diodes and seven input-output pins (i.e., three diodes for gates 10, 12, 14, 16, four diodes for gate 18 and a transistor for gates 19 and 20). For example, the ULC shown in FIG. 11 comprises 16 diodes $d_1$—$d_{16}$ and seven input-output terminals $C'_1$, $C'_2$, $A'_0$—$A'_3$, and $F'$. Diodes $d_1$—$d_3$, $d_4$—$d_6$, $d_7$—$d_9$ and $d_{10}$—$d_{12}$ comprise AND gates 10', 12', 14', and 16', respectively and diodes $d_{13}$—$d_{16}$ connected to the outputs of gates 10', 12', 14' and 16' comprise an OR gate 18'. Gates 10', 12', 14', 16' and 18' correspond to gates 10, 12, 14, 16, and 18 of the ULC of FIG. 1. Similarly, input terminals $C'$, $C'_2$ and $A'_0$—$A'_3$ correspond to terminals $C_1$, $C_2$, and $A_0$—$A_3$ and output terminal $F'$ corresponds to terminal F of FIG. 1. The inputs $X_1$, $\bar{X}_1$, $X_2$, $\bar{X}_2$, and the functions $f(00x_3)$, $f(0,1,ay3)$, $f(1,0,x_3)$ and $f(1,1,x_3)$ are provided over inputs $C'$, $C'_2$ and $A'_0$—$A'_3$ as shown in FIG. 11. It is, of course, obvious that any logical gate of known design may be used to replace these exemplary gates.

Figure 2:
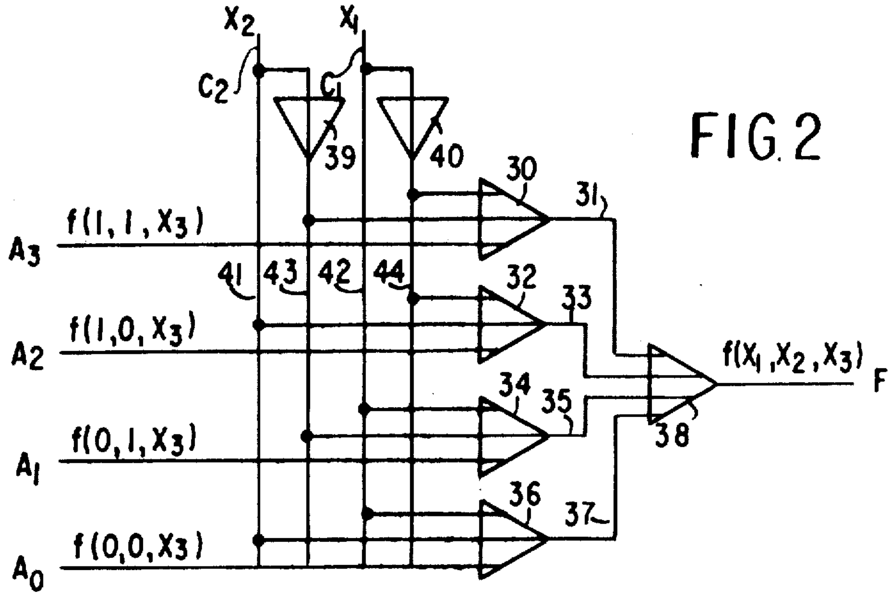
FIG. 2 is a ULC of three variables consisting of NOR gates only.

A ULC of three-variables consisting of only NOR gates is shown in FIG. 2. It is noted that the configuration of NOR gates 30, 32, 34, 36, 38, 39 and 40 of the ULC of FIG. 2 is similar to the configuration shown in FIG. 1 including gates 10, 12, 14, 16, 18, 19 and 20 with the exception of the permutation of the input values for the front terminals $A_0$—$A_3$. That is, input terminal $A_0$ in FIG. 2 is connected to an input for the lower logic gate 36, input terminal $A_1$ is connected to the next logic gate (34) from the bottom, input terminal $A_2$ is connected to an input on logic gate 32 and input terminal $A_3$ is connected to an input on logic gate 30. This will be seen to be an inverse manner of connection as compared with the input connections shown in FIG. 1.

Figure 3:
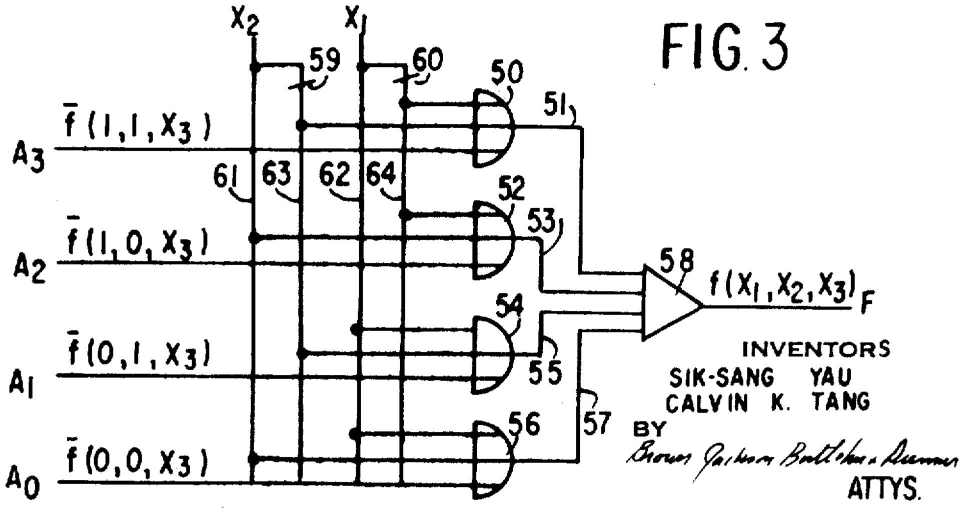
FIG. 3 is a ULC of three variables consisting of OR, NAND and INVERTER gates.

In a further embodiment shown in FIG. 3, NAND, OR and inverter gates are used to provide the desired functions. It will be apparent that in FIG. 3 complement inputs are provided. While such circuit requires different gates, one advantage of the ULC of FIG. 3 over those shown in FIG. 2 is the fact that 16 diodes and three transistors may be used, while the circuit shown in FIG. 2 requires 16 diodes and seven transistors. The circuit shown in FIG. 3 provides a much stronger output signal as compared to that provided by the circuit of FIG. 1. A similar circuit can obviously be provided with AND, NOR and INVERTER gates. In each of the circuits described above, a minimum of seven I/O pins is required.

To evaluate the ULC circuit described hereinabove, a comparison with the results given by Forslund and Waxman is made as follows: With reference to the circuit shown in FIG. 2, as a minimum-pin ULC, and assuming gates 39 and 40 are included in the ULC, it will be seen that the circuit has seven pins, seven gates, and three levels (the inverters constitute the third level). The minimum-pin ULC of three variables given by Forslund and Waxman also has seven pins, but it requires 10 gates and has five levels. The ULC shown in FIG. 2 also has the advantage that only one complement input is required, whereas the minimum-pin ULC given by Forslund and Waxman requires two complement inputs. If the circuit shown in FIG. 2 is to be considered as a minimum-gate ULC, gates 39 and 40 can be excluded from the ULC at the expense of adding two more input pins ($\bar{x}_1$, $\bar{x}_2$), whereby the circuit will comprise a minimum-gate ULC of five gates, nine pins and two levels. The minimum-gate ULC of the prior art identified above has six gates, nine pins and four levels, and can realize only the logic functions in nine out of the 10 equivalence classes.

It will be seen that the absolute minimum number of gates required for any ULC of three variables is five (not including the two inverters), since the realization of the exclusive-or-function of three variables (with the complemented input variables alone requires a minimum of five NAND gates.

Summarily, the logic circuit shown in FIGS. 1, 2, 3, with six input terminals $C_1$, $C_2$, $A_0$, $A_1$, $A_2$, $A_3$ and one output terminal F will produce the function $f(x_1, x_2, x_3)$ at the output terminal F if the six input terminals are connected to the proper values shown in FIGS. 1, 2 and 3. The residue functions $f(0, 0, x_3)$, $f(0, 1, x_3)$, $f(1, 0, x_3)$ and $f(1, 1, x_3)$ are functions of $x_3$ only, and hence each of these functions assumes one of the four values $x_3$, $\bar{x}_3$, 0 or 1. For the same reason, the logic circuits shown in FIGS. 2 and 3 can also produce $f(x_1,x_2,x_3)$, and the proper input terminal connections are shown in the circuits. Therefore, each of the three logic circuits shown in FIGS. 1, 2 and 3 is a ULC–3. In fact, a logic circuit with six input terminals $C_1$, $C_2$, $A_0$, $A_1$, $A_2$, and $A_3$ and one output terminal F is a ULC–3 if the logic circuit gives the output $d_3$ [the output function $f(x_1,x_2,x_3)$] at the output terminal F where $d_3$ is $$d_3=\bar{c}_1\bar{c}_2a_0+\bar{c}_1c_2a_1+c_1\bar{c}_2a_2+c_1c_2a_3$$

and $c_1,c_2,a_0,a_1,a_2$ and $a_3$ are the input variables connected to the input terminals $C_1,C_2,A_0,A_1,A_2$ and $A_3$, respectively. Such circuit will produce $f(x_1x_2x_3)$ if terminals $C_1,C_2,A_0,A_1,A_2$ and $A_3$ are connected to $x_1x_2 f(0,0,x_3)$, $f(0,1,x_3)$, $f(1,0,x_3)$, $f(1,1,x_3)$ respectively. The ULC–3 with this property is called Type I ULC–3, (FIG. 1 for example).

A circuit with six input terminals $C_1$, $C_2$, $A_0$, $A_1$, $A_2$ and $A_3$ connected to the input variables $c_1,c_2,a_0,a_1,a_2$, and $a_3$ respectively and producing an output $e_3$ at the output terminal F of the circuit is a ULC–3 if $$e_3=\bar{c}_1\bar{c}_2a_0+\bar{c}_1c_2\bar{a}_1+c_1\bar{c}_2\bar{a}_2+c_1c_2\bar{a}_3$$

Such a circuit will produce $f(x_1, x_2, x_3)$ if terminals $C_1$,$C_2$,$A_0$,$A_1$,$A_2$ and $A_3$ are connected to $x_1$, $x_2$ $\bar{f}(0,0,x_3)$, $\bar{f}(0,1,x_3)$ $\bar{f}(1,0,x_3)$, $\bar{f}(1,1,x_3)$ respectively. Such a circuit is a Type II ULC-3. Both logic functions $d_3$ and $e_3$ are functions of six variables and $e_3=\bar{d}_3$. The two types of ULC-3 are specified by the two logic functions $d_3$ and $e_3$ of six variables. An example of Type II ULC-3 is shown in FIG. 3.

UNIVERSAL LOGIC CIRCUITS OF FOUR AND MORE VARIABLES

Figure 4:
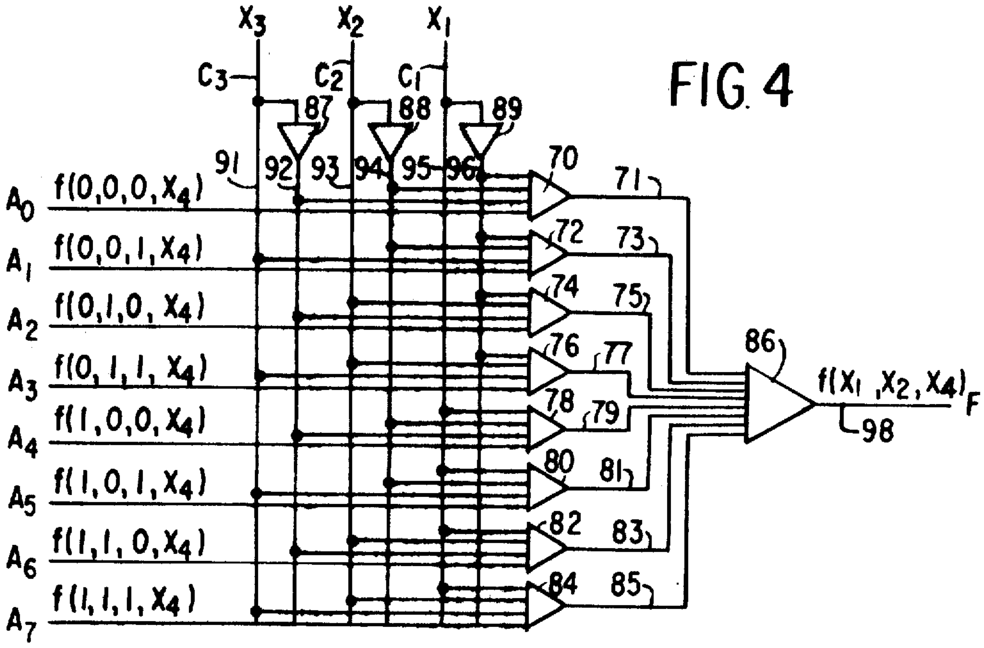
FIG. 4 is a ULC of four variables with two levels and a fan-in 8.

The problem of designing a ULC of four or more variables was also treated in the prior art (Forslund and Waxman), using the same idea of equivalence classes as in the case of three-variable ULC. Due to the large amount of computations required, it is prohibitive to obtain such a ULC by that method. However, the novel circuitry used in the present invention for obtaining the ULC of three variables can readily by extended to four or more variables. Since a logic function $f(x_1, x_2, x_3, x_4)$ of four variables can be written in the form $$\begin{aligned} f(x_1, x_2, x_3, x_4) = {} & \bar{x}_1\bar{x}_2\bar{x}_3 f(0, 0, 0, x_4) + \bar{x}_1\bar{x}_2 x_3 f(0, 0, 1, x_4) \\ & + \bar{x}_1 x_2 \bar{x}_3 f(0, 1, 0, x_4) + \bar{x}_1 x_2 x_3 f(0, 1, 1, x_4) \\ & + x_1\bar{x}_2\bar{x}_3 f(1, 0, 0, x_4) + x_1\bar{x}_2 x_3 f(1, 0, 1, x_4) \\ & + x_1 x_2 \bar{x}_3 f(1, 1, 0, x_4) + x_1 x_2 x_3 f(1, 1, 1, x_4) \end{aligned}$$

the ULC of four variables shown in FIG. 4 is obtained. It is noted that there is a NAND gate with a fan-in of 8 in the illustrated embodiment.

Briefly, the ULC for four or more variables comprises eight logic NAND gates such as 70, 72, etc., three input NAND gates 87—89 and an output NAND gate 86. Each logic gate such as 70, 72, has four inputs including one from each of the four groups $x_3$, $\bar{x}_3$; $x_2$, $\bar{x}_2$; $x_1$, $\bar{x}_1$; and the input appearing at the terminals $A_0$—$A_7$, the input connection of each gate to the first three groups ($x_3$, $\bar{x}_3$, etc.) being determined by the function represented by the corresponding one of the inputs $A_0$—$A_7$. Thus gate 70 which provides the output $\bar{x}_1$ $\bar{x}_2$ $\bar{x}_3$ $f(0,0,0,x_4)$ has a first input connected to conductor 96 ($\bar{x}_1$), a second input connected to conductor 94 ($\bar{x}_2$) and a third input connected to conductor 92 ($\bar{x}_3$) and a fourth conductor connected to terminal $A_0$. The connections for the remaining gates 72, 74 etc., will be apparent therefrom. The output signals from logic gate 70, etc., are fed over NAND gate 86 to output terminal 98.

It will be apparent that the novel ULC for four variables shown in FIG. 4 comprises only 12 NAND gates in a basic configuration of minimum complexity.

Summarily, a Type I ULC-4 is specified by function $d_4$ of 11 variables as follows:

$$\begin{aligned} d_4 = {} & \bar{c}_1\bar{c}_2\bar{c}_3 a_0 + \bar{c}_1\bar{c}_2 c_3 a_1 + \bar{c}_1 c_2 \bar{c}_3 a_2 + \bar{c}_1 c_2 c_3 a_3 \\ & + c_1\bar{c}_2\bar{c}_3 a_4 + c_1\bar{c}_2 c_3 a_5 + c_1 c_2 \bar{c}_3 a_6 + c_1 c_2 c_3 a_7 \end{aligned}$$

A circuit with 11 input terminals $C_1$,$C_2$,$C_3$,$A_0$,$A_1$,...,$A_8$, connected to input variables $c_1$,$c_2$,$c_3$,$a_0$,$a_1$,...,$a_8$ respectively producing the output function $d_4$ is a Type I ULC-4. In order to produce a logic function $f(x_1,x_2,x_3,x_4)$ of four variables, input terminals $C_1$,$C_2$,$C_3$,$A_0$,$A_1$,...,$A_8$ are connected to $x_1$,$x_2$,$x_3$, $f(0,0,0,x_4)$,$f(0,0,1,x_4)$$f(0,1,0,x_4)$,$f(0,1,1,x_4)$,$f(1,0,0,x_4)$, $f(1,0,1,x_4)$, $f(1,1,0,x_4)$, $f(1,1,1,x_4)$, respectively. An example of Type I ULC-4 is shown in FIG. 4.

Similarly, a Type II ULC-4 is specified by the following function $e_4$ of 11 variables:

$$\begin{aligned} e_4 = {} & \bar{c}_1\bar{c}_2\bar{c}_3 \bar{a}_0 + \bar{c}_1\bar{c}_2 c_3 \bar{a}_1 + \bar{c}_1 c_2 \bar{c}_3 \bar{a}_2 + \bar{c}_1 c_2 c_3 \bar{a}_3 \\ & + c_1\bar{c}_2\bar{c}_3 \bar{a}_4 + c_1\bar{c}_2 c_3 \bar{a}_5 + c_1 c_2 \bar{c}_3 \bar{a}_6 + c_1 c_2 c_3 \bar{a}_7 \end{aligned}$$

$=\bar{d}_4$ The manner of implementing such function with gates will be apparent from the disclosure of the ULC-4's above.

Figure 5:
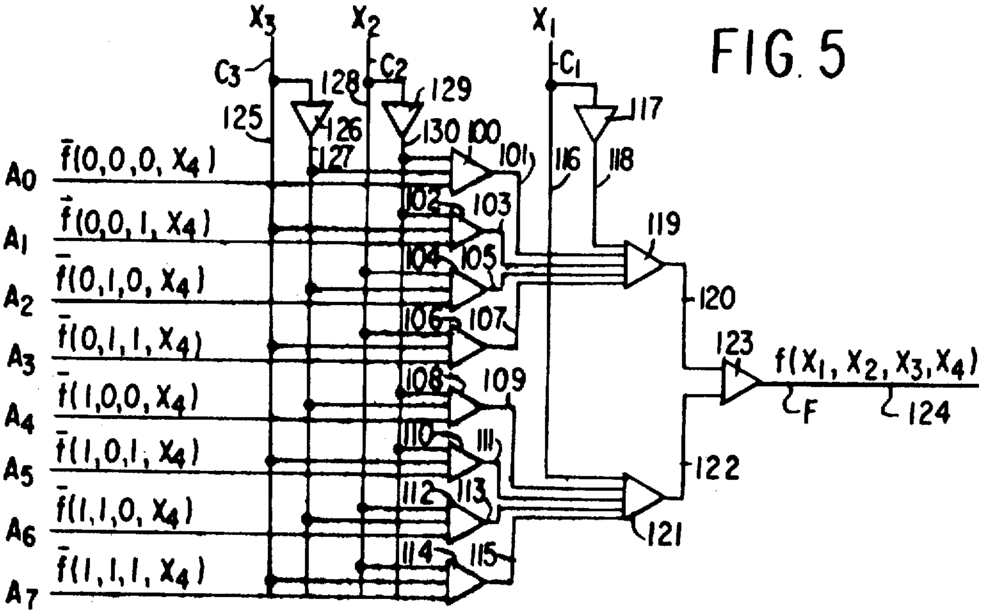
FIG. 5 is a ULC of four variables with three levels and a fan-in 5.

If the addition of further gates can be justified, the inputs to the logic gates may be reduced as shown in FIG. 5. In such arrangement, one of the input terminals of the group $C_1$, $C_2$, $C_3$ is connected to the output side of the logic gates over two NAND gates to a common NAND gate and the output terminal F. Thus, in FIG. 5 the input terminals $C_2$, $C_3$ and $A_0$—$A_7$ input connections are unchanged from that shown in FIG. 4; however, the inputs to terminals $A_0$—$A_7$ are complements of those shown in FIG. 4, and the logic gates, such as 100, 102, etc., do not have an $x_1$, $\bar{x}_2$ input. Instead, the outputs of the logic gates 100, 102, 104, 106 are connected to NAND gate 119 and an $\bar{x}_1$ input is fed thereto by NAND gate 117 and conductor 118. In a similar manner the output of gates 108, 110, 112, 114 is fed to NAND gate 121 along with the $x_1$ input on conductor 116. The output of NAND gates 119, 121 is fed over conductors 120, 122 to NAND gate 123 and output conductor 124 to provide the function $f(x_1,x_2,x_3,x_4)$ output. Although such arrangement requires more gates than the circuit shown in FIG. 4, it will be seen that the fan-in limitations to the gates 100, 102, etc., is reduced, while yet practicing the basic concept of the invention. As in the case of three-variable ULC's, the corresponding embodiments of FIGS. 4 and 5 using NOR gates will use the same configurations of the original NAND realizations with their input terminal connections permutated. The rule of permutation on the residue functions of one variable for the NOR realization is to replace 1 by 0 and 0 by 1 in the residue functions for a NAND realization. For instance, $f(0, 1, 0, x_4)$ in FIG. 4 would be replaced by $f(1, 0, 1, x_4)$ for the corresponding connection in the embodiment utilizing NOR gates.

Figure 5A:
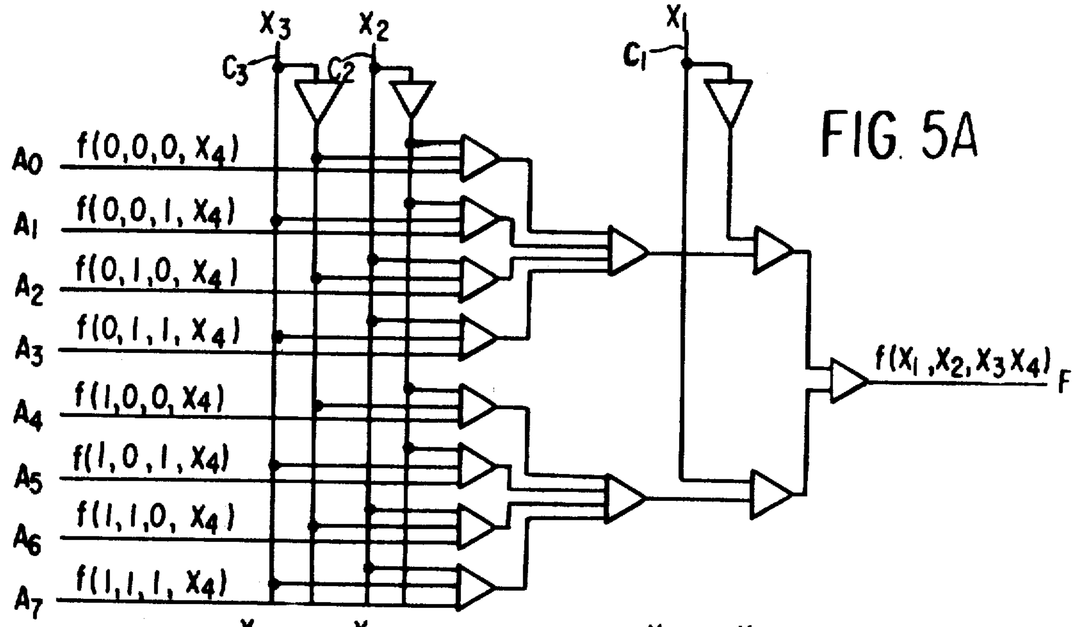
FIG. 5A is a ULC of four variables with four levels and a fan-in 4.

In the circuit shown in FIG. 5A the fan-in limitation is reduced to four. The connection of the gates in such FIG. will be apparent from the preceding description of FIGS. 4 and 5.

Figure 6:
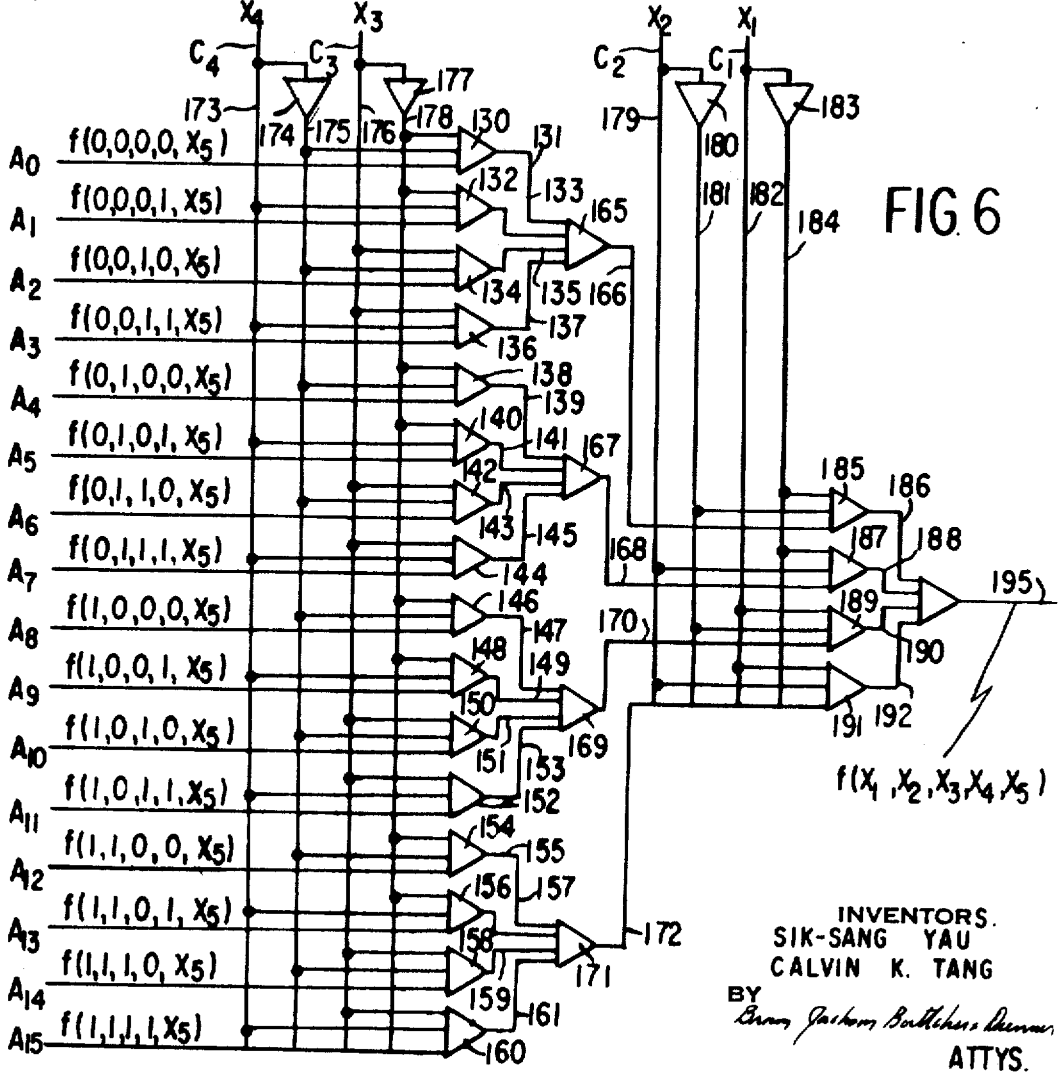
FIG. 6 is a ULC of five variables.

ULC's of five or more variables can be derived in a similar way, one embodiment of such structure being shown in FIG. 6. The ULC of five variables shown in FIG. 6 has a fan-in limitation of four. It is, of course, possible to further reduce the number of gates if a large fan-in is permitted. As there shown, 16 logic gates, such as 130, 132, etc., each have three input terminals, one of which is connected to one input of the group function $f(0, 0, 0, 0, x_5)$—$f(1, 1, 1, 1, x_5)$, another input terminal of which is connected to one of the groups $x_4$, $\bar{x}_4$, and a third input terminal of which is connected to one of the groups $x_3$, $\bar{x}_3$. The 16 gates are divided into groups of four, each of which groups is connected over an associated NAND gate, such as 165, to a further level. Thus, the output of the first group of four gates 130, 132, 134, 136 are fed to gate 165, the outputs of the second group 138, 140, 142, 144, is connected over NAND gate 167, to the further level, etc. The further level includes a second set of logic gates 185, 187, 189, 188, each gate of which has one input terminal connected to one of the groups of inputs $x_2$, $\bar{x}_2$, a second input terminal connected to one of the groups of inputs $x_1$, $\bar{x}_1$ and a third input terminal connected to the output of one of the logic gates 165, 167, 169, 171. The output of gates 185, 187, 189, 191 is connected over conductors 186, 188, 190, 192 and NAND gate 193 to provide the logic function $f(x_1, x_2, x_3, x_4, x_5)$ over output conductor 195.

UNIVERSAL LOGIC CIRCUIT OF $n$ VARIABLES (ULC-$n$)

Figure 7:
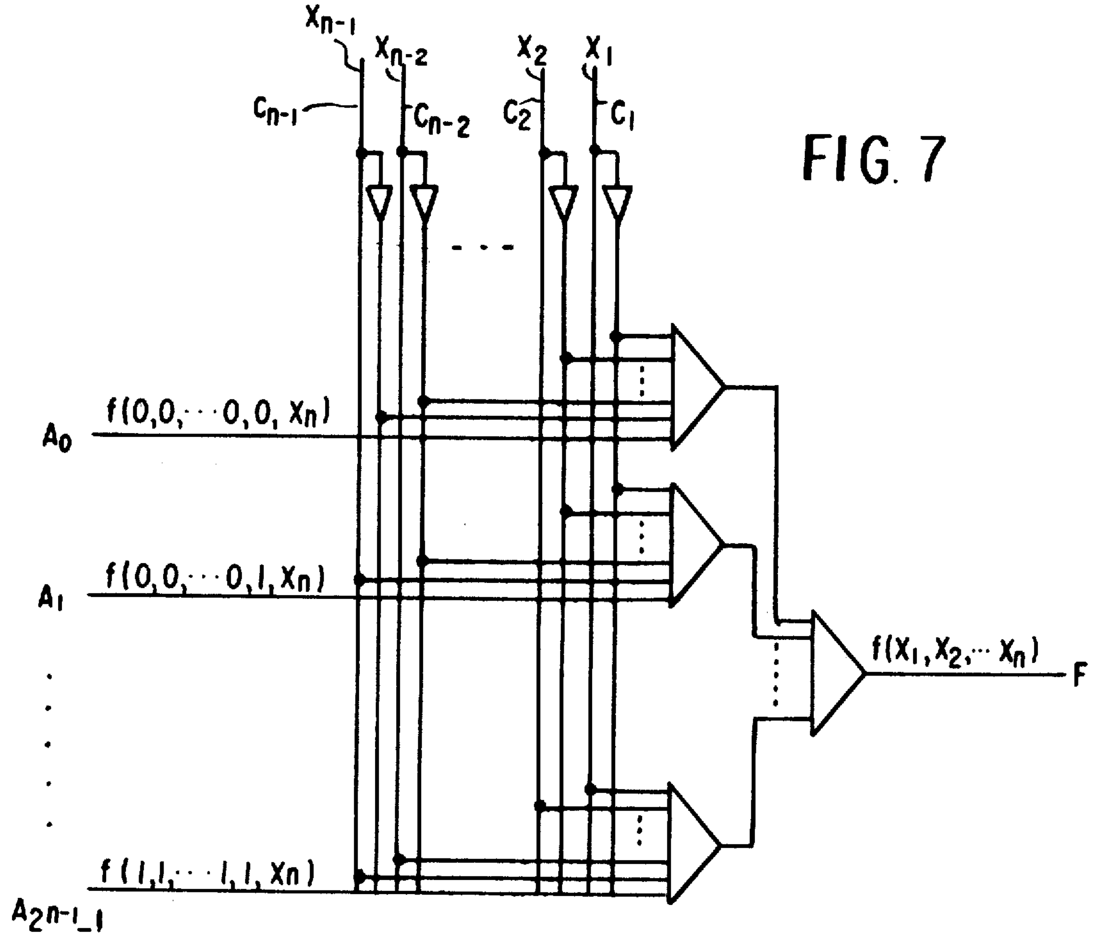
FIG. 7 is a showing of a type I ULC-$n$.

The method used in the above description to obtain ULC-3, UCL-4, ULC-5 can be readily extended to obtain ULC-$n$. The Type I ULC-$n$ is specified by the $p=2^{n11}+n-a1$ variables function:

$$d_n = \sum_{i=0}^{2^{n-1}-1} c_1^{i_1} c_2^{i_2} \ldots c_{n-1}^{i_{n-1}} a_1$$

where the superscripts $i_1 i_2 \ldots i_{n11}$ form the binary representation of $i$ and $c_j^0=\bar{c}_j, c_j^1=c_j (1 \leq j \leq n-1)$ A circuit with $p$ input terminals $C_1$,$C_2$,...,$C_{n11}$, $A_0$,$A_1$,..., $A_{2^{n-1}-1}$ connected to the input variables $c_1$, $c_2$...$c_{n11}$, $a_0$, $a_1$,..., $a_{2^{n-1}-1}$ respectively and producing the function $d_n$ at the output terminal F is a type 1 ULC–$n$. To obtain any $n$-variable function $f(x^1, x_2, \ldots, x_n)$, the input terminal $C_i$ is connected to $x_i (1 \leq i \leq n-1)$ and $A_j (0 \leq j \leq 2^{n-1}-1)$ to $f(j_1, j_2, \ldots, j_{n-1}, x_n)$, where $j_1 j_2 \ldots j_{n-1}$ is the binary representation of $j$. An example of Type 1 ULC–$n$ is shown in FIG. 7.

It will be recalled that the circuit of FIGS. 1 and 2 is specified by function $d_3 = \bar{c}_1\bar{c}_2a_0 + c_1c_2a_1 + c_1\bar{c}_2a_2 + c_1c_2a_3$. With reference to the general function $d_n$ above (1) it will be apparent that for a three variable logic circuit the function becomes $$d_3 = \sum_{i=0}^{(2^{3-1}-1)} c_1^{i_1} c_2^{i_2} a_i = \sum_{i=0}^{3} c_1^{i_1} c_2^{i_2} a_i$$

As noted above, the superscript $i_1 i_2 \ldots i_{n11}$ forms the binary representation of $i$. Thus, in the example:

| | $i_1$ | $i_2$ |
|---|---|---|
| i=0 | 0 | 0 |
| i=1 | 0 | 1 |
| i=2 | 1 | 0 |
| i=3 | 1 | 1 |

and the summation $\Sigma_0^3$ becomes $$d_3 = c_1^0 c_2^0 a_0 + c_1^0 c_2^1 a_1 + c_1^1 c_2^0 a_2 + c_1^1 c_2^1 a_3$$
$$= \bar{c}_1 \bar{c}_2 a_0 + \bar{c}_1 c_2 a_1 + c_1 \bar{c}_2 a_2 + c_1 c_2 a_3$$

which is identified above.

Similarly, Type II ULC–$n$ is specified by the $p$-variable function $e_n = \bar{d}_n$. Any circuit with $p$ input terminals $C_1, C_2, \ldots, C_{n-1}$, $A_0, A_1, \ldots, A_{2^{n-1}-1}$ connected to the input variables $c_1, c_2, \ldots, c_{n-1}$, $a_0 a_{1a'} \cdots a_{2^{n-1}-1}$ respectively and producing the output function $e_n$ at the output terminal F is a Type II ULC–$n$. To obtain any $n$-variable function $f(x_1, x_2, \ldots, x_n)$, the input terminal $C_i$ is connected to $x_i (1 \leq i \leq n-1)$ and $A_j (0 \leq j \leq 2^{n-1}-1)$ to $\bar{f}(j_1, j_2, \ldots, j_{n-1}, x_n)$, where $j_1 j_2 \ldots j_{n-1}$ is the binary representation of $j$.

It can also be shown that a ULC of $n$ variables obtained by each of the foregoing circuits shown in FIGS. 1—7 has $p$ input pins, where $$p = 2^{n-1} + n - 1.$$

With a fan-in limitation of four, this approach will yield a ULC of $n$ variables, $n \geq 2$, which has $q$ gates and $\tau$ levels, where $$q = \begin{cases} \frac{5}{3}(2^{n-1}-1) + (n-1) \text{ when } n \text{ is odd} \\ \frac{10}{3}(2^{n-2}-1) + (n+2) \text{ when } n \text{ is even} \end{cases}$$

$$l \begin{cases} = n \text{ when } n \text{ is odd} \\ n+1 \text{ when } n \text{ is even} \end{cases}$$

It is noted that for any $n$ only one complementary input variable is required, and all others can be true input variables in a ULC obtained by this method.

A UNIVERSAL LOGIC CIRCUIT USING UNIVERSAL LOGIC MODULES

In the foregoing disclosure, there is set forth the manner in which a ULC of any large number of variables may be provided. However, it follows that the complexity of the ULC increases rapidly as the number of variables increases. From either an economical point of view or maintenance point of view, it becomes prohibitive to build ULC's of various large numbers of variables in individual integrated circuit packages. According to the present invention, a ULC of a large number of variables is provided by using identical ULC's of a small number of variables as modules. Obviously, there art two advantages of such technique. First, a large quantity of identical ULM's may be used to build ULC's of various numbers of variables. Secondly, when there are faults in a ULC, it is only necessary to replace the faulty ULM's instead of the whole ULC.

ULC MODULES OF N VARIABLES

(N ODD)

Figure 8:
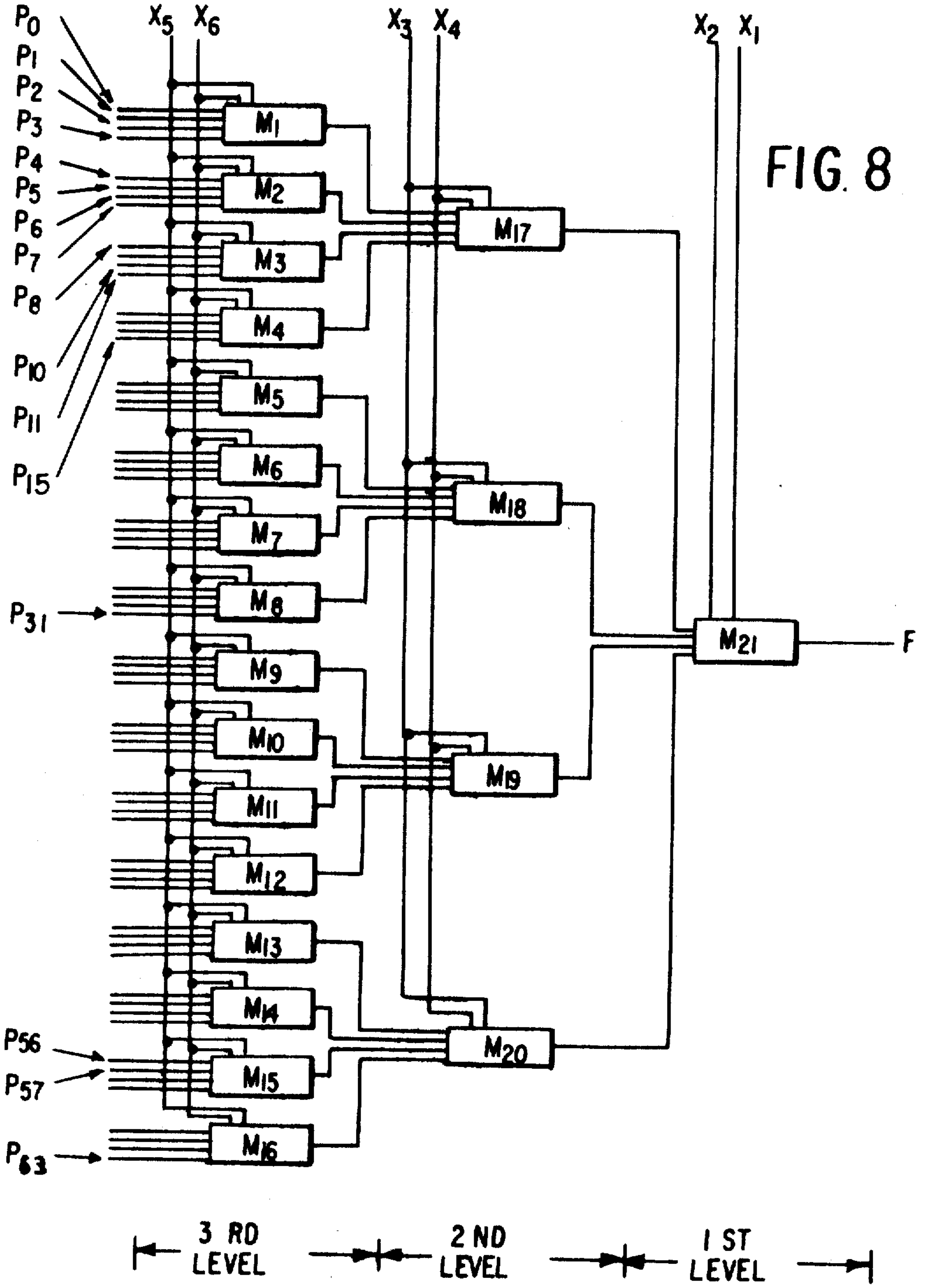
FIG. 8 is a modular realization of a ULC of seven variables using ULM-3's.
Figure 8A:
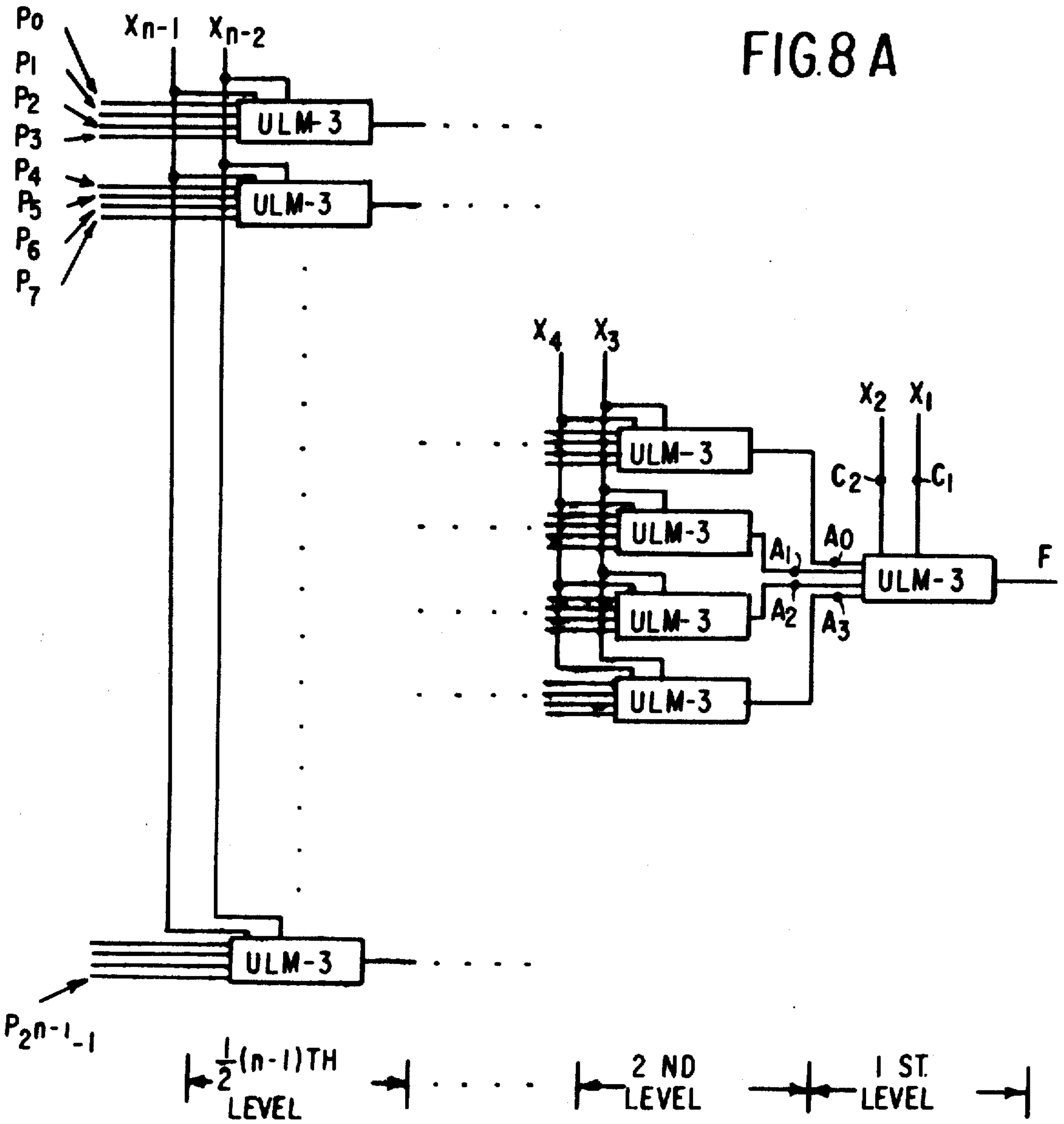
FIG. 8A is a modular realization of a ULC of $n$ variables using ULM-3's.

In deriving the modular realization of a ULC of $n$ variables using ULC's of three variables as the ULM's (denoted by ULM-3's), the first embodiment considered is the case when $n$ is odd. Since any logic function $(f(x_1, x_2 \ldots x_n)$ of $n$ variables, $n \geq 3$, can be expanded to the form $$f(x_1, x_2, \ldots, x_n) = \bar{x}_1\bar{x}_2 f(0, 0, x_3, \ldots, x_n) + \bar{x}_1 x_2 f(0, 1, x_3, \ldots, x_n) + x_1\bar{x}_2 f(1, 0, x_3, \ldots, x_n) + x_1\bar{x}_2 f(1, 1, x_3, \ldots, x_n),$$

such module can be provided by a ULM-3, provided that the side terminals $C_1$ and $C_2$ and the front terminals $A_0$, $A_1$, $A_2$ and $A_3$ shown in FIGS. 1 or 2 are connected to the input variables $x_1$ and $x_2$ and the residue functions $f(0,0,x_3,\ldots,x_n)$, $f(0,1,x_3,\ldots,x_n)$, $f(1,0,x_3,\ldots,x_n)$ and $f(1,1,x_3,\ldots,x_n)$ respectively. This ULM-3 forms the first level of the modular realization of the ULC. Since this process can be repeated to each of the residue functions, the second level of the modular realization consists of four ULM-3's whose side terminals are connected to the input variables $x_3$ and $x_4$, and whose front terminals are connected to appropriate residue functions of $n$–4 variables. Such process is continued until the residue functions become functions of the variable $x_n$. Because $n$ is odd, and because each expansion reduces the number of variables of the residue functions by exactly 2, it requires a total of $(n-1)/2$ expansions. This implies that $f(x_1,\ldots,x_n)$ can be realized by using ULM-3's in a tree structure consisting of $(n-1)/2$ levels, as shown in FIG. 8$a$. It is seen that there are $4^{j11}$ ULM-3's in the $j$th level of the tree structure. Each of the front terminals of the ULM-3's in the last level is connected to one of the four values 0, 1, $x_n$ and $\bar{x}_n$ defined by the corresponding residue function of variable $x_n$, which can be found as follows:

a. Trace the path from the output terminal F to the front terminal in the last level in question in the tree structure, and use two bits to write the binary representation of the subscript $h$ for the front terminal $A_h$ of the ULM-3 in each level.

b. The concatenation of the $(n-1)/2$ 2-types in the order of the path forms the argument of the residue function for the front terminal. For instance, if the path from the output terminal to a front terminal in the last level in a modular ULC of five levels passes through the front terminals $A_1$, $A_2$, $A_0$, $A_3$, $A_1$ of the ULM-3's in the 1st, 2nd... 5th levels respectively, the residue function for this terminal is $f(0,1,1,0,0,0,1,1,0,1,x_n)$. For convenience, we shall call the front terminal of a ULM-3 in the last level $P_i$ if it is connected to the residue function with the binary argument whose decimal representation is $i$. It is obvious that there are $2^{n11}$ front terminals of the ULM-3's in the last level for a modular ULC of $n$ variables. The application of such teaching to a modular embodiment of a ULC of 7 variables using ULM-3's is shown in FIG. 8.

As there shown, $f(x_1,\ldots,x_7)$ can be realized by using ULM-3's in a tree structure consisting of $(7-1)/2=3$ levels. It is seen that there are $4^{3-1} 4^2 = 16$ ULM-3's in the third level of the tree structure. Each of the front terminals of the ULM-3's in the last level is connected to one of the four values 0, 1, $x_7$ and $\bar{x}_7$ defined by the corresponding residue function of variable $x_7$.

(N EVEN)

When $n$ is even and when only ULM-3's can be used in the modular realization, only slight modification in the first level is required. Instead of expanding the logic function according to the form used for the first level when $n$ is odd, the logic function is expanded as follows: $f(x_1, x_2, \ldots, x_n) = \bar{x}_1 f(0, x_2, \ldots, x_n) + x_1 f(1, x_2, \ldots, x_n)$. It is easily seen that such expansion can be realized by a ULM-3, provided that the side terminals $C_1$ and $C_2$ are both connected to the input variable $x_1$, the front terminals $A_0$ and $A_3$ connected to the residue functions $f(0,x_2,\ldots,x_n)$ and $f(1,x_{2a} \cdots x_n)$ respectively, and the connections for $A_1$ and $A_2$ are don't-care. Then, each of the residue functions is a function of an odd number of variables and hence can be realized by the previous method. The residue functions for the front terminals of the ULM-3's in the last level can be found in the same way as before except that only the first bit in the binary argument of the residue function corresponds to the subscript of the front terminal of the ULM-3 in the first level. The first bit is 0 or 1 depending upon whether the front terminal of the ULM-3 in the first level in the path is $A_0$ or $A_3$ respectively.

Summarily, a ULC of a large number of variables can be realized by using ULC's of a smaller number of universal logic modules (ULM's). Expanding the logic function of $f$ of $n$ variables:

$$f=f(x_1, x_2, \ldots, x_k, x_{k+1}, \ldots, x_n)$$

$$=\sum_{i=0}^{2^{k-1}-1} x_1^{i_1}x_2^{i_2}\ldots x_{k-1}^{i_{k-1}}f(i_1, i_2, \ldots, i_{k-1}, x_k, x_{k+1}, \ldots, x_n)$$

where the subscripts $i_1i_2\ldots i_{k-1}$ form the binary representation of $i$, and $x_j^0=\bar{x}_j, \bar{x}_j^1=x_j (1\leq j\leq k-1)$. Thus $f$ can be realized by a Type I ULC of $k$ variables (ULM-$k$), provided that the input terminals $C_i$ are connected to $x_i (1\leq i\leq k-1)$ and input terminals $A_i$ are connected to $f(i_1,i_2,\ldots,i_{k-1},x_k,x_{k+1},\ldots,x_n)$, where $i_1i_2\ldots i_{k-1}$ is the binary representation of $i (0\leq i\leq 2^{k-1}-1)$. This Type I ULM-$k$ forms the first level of the modular realization of the ULC-$n$. This process is repeated to each of the residue functions $f(i_1,i_2,\ldots,i_{k-1},x_k,x_{k+1},\ldots,x_n)$, and the second level of the modular realization consists of $2^{k-1}$ Type I ULM-$k$'s. Each of these second level ULM-$k$'s will have the input terminals $C_i$ connected to input variables $x_{k+i-1} (1\leq i\leq k-1)$ and input terminals $A_i$ connected to the appropriate residue functions of $n-2(k-1)$ variables. As the process is continued, it is seen that each level of expansion will reduce the number of variables in the residue function by $k-1$. Hence, if $n-1$ is divisible by $k-1$, then at the $t$th level of the modular realization, where $t=(n-1)/(k1)$, the residue function is of the variable $x_n$ only and the expansion process terminates.

If $k-1$ does not divide $n-1$, then some modification is necessary.

$$\text{Let } \frac{n-1}{k-1}=t+\frac{r}{k-1}, \text{ where } r<k-1$$

Then $f$ is expanded as follows:

$$f=f(x_1,x_2, \ldots ,x_r,x_{r+1}, \ldots ,x_n)$$

$$=\sum_{i=0}^{2^r-1} x_1^{i_1}x_2^{i_2} \ldots x_r^{i_r}f(i_1,i_2, \ldots ,i_r,x_{r+1},x_{r+2}, \ldots ,x_n)$$

where the subscript $i_1i_2\ldots i_r$ forms the binary representation of $i$ and $x_j^0=\bar{x}_j, x_j^1 (1\leq j\leq r)$. Hence, $f$ can be produced by a ULM-$k$ if input terminals $C_1,C_2,\ldots,C_{k-1}$ are connected to bias 0, $C_i$ are connected to input variables $x_{i-(k-r-1)}, (k-r\leq i\leq k-1)$, and $A_i$ are connected to $f(i_1,i_2,\ldots,i_r,x_{r+1},\ldots,x_n),(0\leq i\leq 2^r-1)$. The connections for $A_i (2^{r-1}\leq i\leq 2^k-1)$ are don't-care. Each residue function in the above formula is a function of $n-r$ variables, where $n-r-1$ is divisible by $k-1$. Thus, the previous procedure can be applied to complete the modular realization of the ULC.

If more than one kind of Type I ULM is available, then the don't-care connection can always be avoided. Suppose in addition to Type I ULM-$k$'s, Type I ULM-$r$ is also available. Then, in the first expansion Type I ULM-$r$ is used without don't-care connection, and all the higher level expansion can use Type I ULM-$k$'s. Or if Type I ULM-$m$ is also available, where $m=k+r$, then the first and second level expansion mentioned before can be combined to one level by using a Type I ULM-$m$.

The modular realization of ULC using Type I ULC can readily be extended to the use of Type II ULM by observing the equation $$e_n=\sum_{i=1}^{2^{n-1}-1} c_1^{i_1}c_2^{i_2} \ldots c_{n-1}^{i_{n-1}}\bar{a}_i$$

If only ULM's of a fixed number of variables can be used, it is often necessary to have some don't-care terminal connections to some of the ULM's and hence some of the ULM's are not utilized to their full capacity. It can be shown that if only ULM-4's are used in the modular realization there will not be any don't-care terminal connections to any ULM-4 for a ULC of $n$ variables, where $n=3g+4$ and $g$ is a nonnegative integer. However, if both ULM-3 and ULM-4 are used in the modular realization, the don't-care terminal connections can always be avoided. Furthermore, it is noted that the tree structure of the modular realization of a ULC of $n$ variables using ULM-$k$'s always has $2^{n-1}$ front terminals in the last level for any $k$.

ULC WITH CONCURRENT ERROR-DETECTING PROPERTY

Figure 9:
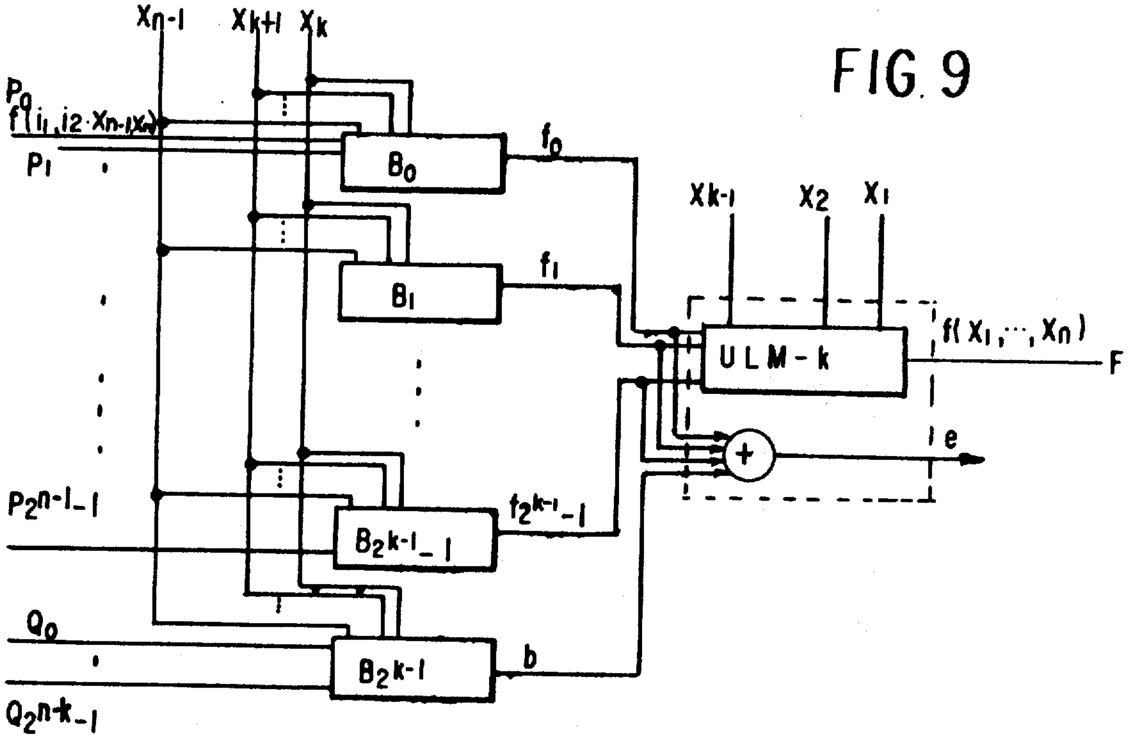
FIG. 9 shows a circuit in which a check bit is applied to a ULC to detect a single fault.

A check bit can be applied to a ULC to detect any single fault as shown in the circuit of FIG. 9. Each box $B_i$ is a ULC of $n-k+1$ variables, $0\leq i\leq 2^{k-1}-1$, with the corresponding outputs $f_i=(i_1,i_2,\ldots,i_{k-1},x_k,x_{k+1},\ldots,x_n)$, where $i_1i_2\ldots i_{k11}$ is the binary representation of $i$. The methods for finding the appropriate values for terminals $P_0,\ldots,P_{2^{n-1}-1}$ was described above in the portion identified "ULC Modules of $n$ Variables." The appropriate values over terminals $Q_0,\ldots,Q_{2^{n-k}-1}$ are found in the same manner. A check bit $b$ is applied to check every $f_i (0\leq i\leq 2^{k-1}-1)$. Hence we have $$b=f_0\oplus f_1\oplus \cdots \oplus f_{2^{k-1}-1}$$

where $\oplus$ denotes the exclusive-OR operation. Since each $f_i$ is a function of $n-k+1$ variables, $x_k,x_{k+1},\ldots x$, $b$ is also a function of the same $n-k+1$ variables and can be produced by a ULC $B_{2^{k-1}}$ of $n-k+1$ variables. The existence of a malfunctioning $B_i$, $0\leq i\leq 2^{k-1}$ 1 can be indicated by the output $e$ of an exclusive-OR gate as shown in FIG. 9. Both the ULM-$k$ at the output of the circuit and the exclusive-OR gate have to be reliable and be built together in one highly reliable package.

It is noted that this approach can be extended to concurrent error correction for ULC's by using an error correcting code hereafter.

IMPROVING THE RELIABILITY OF THE MODULAR REALIZATION OF A ULC BY AN ERROR-CORRECTING CODE

Figure 10:
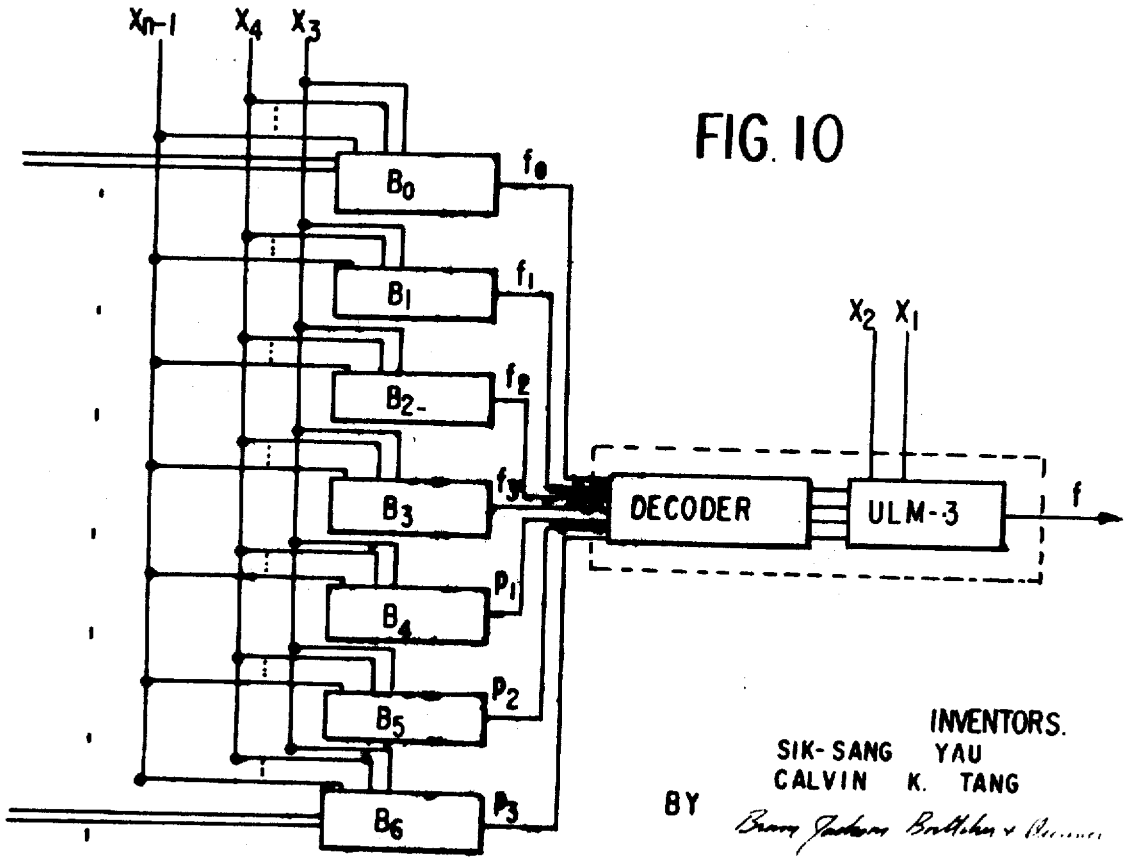
FIG. 10 is a modular realization of a ULC of $n$ variables using single-error-correcting code.

The reliability of the modular realization of a ULC can be improved by adding redundant ULM's using an error-correcting code. In the present disclosure a single-error-correcting code is used to increase the reliability of the modular realization of a ULC of $n$ variables, although the manner in which other codes can be used for a like purpose will be obvious therefrom. The circuit is shown in FIG. 10 and the following notations are employed.

$f=f(x_1,x_2,x_3,\ldots,x_n)$
$f_0=(0, 0, x_3,\ldots,x_n)$
$f_1=(0, 1, x_3,\ldots,x_n)$
$f_2=(1, 0, x_3,\ldots,x_n)$
$f_3=(1, 1, x_3,\ldots,x_n)$ The four blocks $B_0$, $B_1$, $B_2$ and $B_3$ are the modular realizations of the ULC's of $n-2$ variables and have the outputs $f_0,f_1,f_2$ and $f_3$ respectively. The single-error-correcting code with four information symbols is used, and its parity-check matrix H and generator matrix G are given by $$H=\begin{bmatrix}0&0&0&1&1&1&1\\0&1&1&0&0&1&1\\1&0&1&0&1&0&1\end{bmatrix} \quad (1)$$

$$G=\begin{bmatrix} p_1 & p_2 & f_0 & p_3 & f_1 & f_2 & f_3 \\ 1&1&1&0&0&0&0\\1&0&0&1&1&0&0\\0&1&0&1&0&1&0\\1&1&0&1&0&0&1\end{bmatrix} \quad (2)$$

The four information symbols to be encoded are $f_0,f_1,f_2$ and $f_3$, which are placed in the 3rd, 5th, 6th and 7th positions of the 7-bit code word respectively, while the remaining three positions are the parity-check symbols $p_1$, $p_2$, $p_3$, as shown in (2). It follows from (1) and (2) that the parity-check symbols $p_1,p_2$ and $p_3$ can be expressed in terms of $f_0,f_1,f_2$ and $f_3$ as follows:

$$p_1=\bar{f}_0\bar{f}_1f_3+\bar{f}_0f_1\bar{f}_3+f_0f_1f_3+f_0\bar{f}_1\bar{f}_3$$
$$p_2=\bar{f}_0\bar{f}_2f_3+\bar{f}_0f_2\bar{f}_3=f_0\bar{f}_2\bar{f}_3+f_0f_2f_3$$
$$p_3=\bar{f}_1\bar{f}_2f_3+\bar{f}_1f_2\bar{f}_3+f_1\bar{f}_2\bar{f}_3+f_0f_2f_3$$

Since $f_0,f_1,f_2$ and $f_3$ are functions of the $n-2$ variables $x_3,\ldots,x_n$, $p_1,p_2$ and $p_3$ are also functions of the same $n-2$ variables $x_3,\ldots,x_n$. Thus, each of $p_1,p_2,p_3$ can be realized by using the modular realization of an ULC of $n-2$ variables. The three ULC's of $n-2$ variables for $p_1,p_2$ and $p_3$ are represented by the blocks $B_4,B_5$ and $B_6$ shown in FIG. 10. The seven signals $f_0,f_1,f_2,f_3,p_1,p_2,p_3$ are then fed to a decoder followed by a ULM-3 which produces the final output $f(x_1,\ldots,x_n)$. The decoder and the ULM-3 connected to the output terminal have to be of high reliability. It is found that the decoder will have seven exclusive-OR gates, three INVERTERS and four AND gates. The decoder can be implemented together with the ULM-3 in a single reliable package. Let a block containing faulty ULM's be called a faulty block. It is seen that such a ULC of $n$ variables will give correct output for the case that there is more than one faulty block, provided that only one erroneous block signal will show up at a time (under any input combination). If there exists a faulty block in the ULC, the easiest way to detect this faulty block is to add three output terminals to the decoder showing the syndrome of the code words. The faulty block can be located automatically by simply reading the syndrome when the first fault occurs during the use of the ULC, and no separate test is required. The increase of cost for implementing this scheme is that for any $n>3$, we have to add 75 percent redundant ULC's of $n-2$ variables and one highly reliable decoder-ULM-3 package. It is noted that the method illustrated above can easily be extended to the use of Hamming code with more than four information bits. Furthermore, the error-correcting code that can be used for increasing the reliability of the ULC is not restricted to the Hamming code, and the number of errors that can be corrected is not restricted to a single one.

CONCLUSION

The foregoing disclosure sets forth universal logic circuits which are especially suitable to implementation by the use of integrated circuit packages. Various effects, such as the number of pins, the number of logic gates and the number of logic levels in a package have been set forth. Furthermore, a method for improving the reliability of a ULC using error-correcting codes has been demonstrated.

It is noted that an important practical advantage of using a ULC to realizing a given logic function is that there is no need to find the minimal sum or minimal product of the logic function, as has been previously required in conventional realization methods. The only simplification process necessary to be applied to the logic function is to detect whether it can be written in a form which involves fewer variables. This result is used to determine a ULC of the smallest number of variables for realizing the given logic function.

It should be pointed out that the ULC's disclosed herein are restricted to realizing any single logic function. A natural extension of this invention is to use a multiple-output ULC for realizing any set of $m$ logic function. One way to obtain such a multiple-output ULC is to connect the $m$ ULC's, each of which realizes one of the $m$ logic functions, in the form of sharing the common input-variable terminals. It is quite unlikely that a multiple-output ULC with fewer I/0 terminals can be obtained, since in general there are no fixed relations among the $m$ logic functions to be realized.

We claim:

1. A universal logic circuit for providing the function for at least three variables $x_1$, $x_2$ and $x_3$ comprising input means including at least one group of paths $C_1$, $\bar{C}_1$ for providing $x_1$, $\bar{x}_1$ inputs, a second group of paths $C_2$, $\bar{C}_2$ for providing $x_2$, $\bar{x}_2$ inputs, a third group of paths for providing four separate inputs representing the residue functions $f(0,0,x_3)$ $f(0,1,x_3)$ $f(1,0,x_3)$ and $f(1,1,x_3)$ of a function $f(x_1, x_2, x_3)$ of three variables $x_1$, $x_2$, and $x_3$ expanded as functions of $x_3$ only; at least four logic gates comprising one gate connected to the paths for the $\bar{x}_1$, $\bar{x}_2$ and $f(0,0,x_3)$ inputs, a second gate connected to the paths for the $\bar{x}_1$, $x_2$, $f(0,1,x_3)$ inputs, a third gate connected to the paths for the $x_1$, $\bar{x}_2$, $f(1,0,x_3)$ inputs, and a fourth gate connected to the paths for the $x_1$, $x_2$, $f(1,1,x_3)$ inputs, and output means connected to combine the outputs of said four gates.

2. A universal logic circuit as set forth in claim 1 in which said input means includes six input terminals for said logic circuit, comprising a first input terminal for input $x_1$, a second input terminal for $x_2$, and four separate terminals for said four residue functions, and inverter means connected to said $C_1$, $C_2$ input terminals to provide said $\bar{x}_1$, $\bar{x}_2$ signals for said $\bar{C}_1$, $C_2$ paths.

3. A universal logic circuit as set forth in claim 1 in which each of said logic gates includes a diode for each input thereto, and said output means including a plurality of semiconductor devices, each device respectively connected to the output of the diodes in an associated gate.

4. A universal logic circuit as set forth in claim 1 in which the number of variables is $n=3$, and the number of input pins $p$ is $2^{n-1}+-1=6$.

5. A universal logic circuit for providing the function for at least four variables $x_1$, $x_2$, $x_3$ and $x_4$ comprising input means including at least one group of input paths $C_1$, $\bar{C}_1$ for providing $x_1$, $\bar{x}_1$ inputs, a second group of input paths $C_2$, $\bar{C}_2$ for providing $x_2$, $\bar{x}_2$ inputs, a third group of input paths $C_3$, $\bar{C}_3$ for providing $x_3$, $\bar{x}_3$ inputs, and a fourth group of paths for each of the residue functions of $f(x_1\ x_2\ x_3\ x_4)$ expanded as functions of $x_4$ only, at least eight logic gates comprising one gate connected to input paths for $\bar{x}_1$, $\bar{x}_2$, $\bar{x}_3$ and $f(0,0,0,x_4)$, a second gate connected to the input paths for $\bar{x}_1$, $\bar{x}_2$, $x_3$ and $f(0,0,1,x_4)$, a third gate connected to the input paths for $\bar{x}_1$, $x_2$, $\bar{x}_3$ and $f(0,1,0,x_4)$, a fourth gate connected to the input paths for $\bar{x}_1$, $x_2$, $x_3$ and $f(0,1,1,x_4)$, a fifth gate connected to the input paths for $x_1$, $\bar{x}_2$, $\bar{x}_3$ and $f(1,0,0,x_4)$, a sixth gate connected to the input paths for $x_1$, $\bar{x}_2$, $x_3$ and $f(1,0,1,x_4)$, a seventh gate connected to the input paths for $x_1$, $x_2$, $\bar{x}_3$ and $f(1,1,0,x_4)$, an eighth gate connected to the input paths for $x_1$, $x_2$, $x_3$ and $f(1,1,1,x_4)$, and output means for combining the function outputs provided by said eight gates.

6. A universal logic circuit as set forth in claim 5 in which each of said eight gates is connected to only the paths for providing said $x_2,x_3,\bar{x}_2,\bar{x}_3$ inputs and the indicated residue functions, and which includes a first additional gate means connected to the outputs of a first plurality of said eight gates and said $x_1$ input, and a second additional gate means connected to the outputs of the remaining one of said eight gates and said $\bar{x}_1$ input, and in which the output of said first and second additional gate means is connected to said output means.

7. A universal logic circuit for providing the function for a plurality of $n$ variables $x_1$, $x_2,\ldots,x_n$ comprising input means including at least one group of paths $C_1$, $\bar{C}_1$ for providing $x_1$, $\bar{x}_1$ inputs, a second group of paths $C_2$, $\bar{C}_2$ for providing $x_2$, $\bar{x}_2$ inputs, a third group of paths for providing at least four separate inputs representing the residue functions $f(0,0,\ldots,x_n)$, $f(0,1,\ldots,x_n)$, $f(1,0,\ldots,x_n)$, and $f(1,1,\ldots,x_n)$ of a function $f(x_1,x_2,\ldots,x_n)$ of $n$ variables $x_1$, $x_2,\ldots,x_n$ expanded as a function of $x_n$ only; at least four logic gates comprising one gate connected at least to the paths for the $\bar{x}_1$, $\bar{x}_2$ and $f(0,0,\ldots,x_n)$ inputs, a second gate connected at least to the paths for the $\bar{x}_1,x_2$, $f(0,1,\ldots,x_n)$ inputs a third gate connected to at least the paths for the $x_1$, $\bar{x}_2$, $f(1,0,\ldots,x_n)$ inputs, and a fourth gate connected to at least the paths for the $x_1$, $x_2$, $f(1,1,\ldots,x_n)$ inputs, and a fourth gate connected to at least the paths for the $x_1$, $x_2$, $x_1,x_2$, $f(1,1,\ldots,x_n)$ inputs, and output means connected to combine the outputs of said gates.

8. A Universal logic circuit as set forth in claim 7 in which the number of variables is $n$ and the number of input pins $p$ is $2^{n-1}+n-1$.

9. In a circuit as set forth in claim 7 in which the number of inputs to each gate is limited to four and in which the number of levels $l$ is $$l=\begin{cases} n \text{ when } n \text{ is odd} \\ n-1 \text{ when } n \text{ is even} \end{cases}$$

10. In a circuit as set forth in claim 7 in which the number of inputs to each gate is limited to four, and which has $q$ gates when $$q=\begin{cases} \frac{5}{3}(2^{n-1}-1)+(n-1) \text{ when } n \text{ is odd} \\ \frac{10}{3}(2^{n-2}-1)+(n+2) \text{ when } n \text{ is even} \end{cases}$$

11. A universal logic circuit for providing the function for $n$ variables comprising input means including at least one group of input terminals $C_1, C_2, \ldots, C_{n-1}$ for providing input variables $c_1, c_2, \ldots, c_{n-1}$, a second group of separate input terminals $A_0, A_1, \ldots, A_{2^{n-1}-1}$ connected to provide different input variables $a_0, a_1 a_{2^{n-1}-1}$, a plurality of logic gates responsive to the inputs on said input terminals $C_1, C_2, \ldots, C_{n-1}$ and $A_0, A_1, \ldots, A_{2^{n-1}-1}$ connected to provide a function $d_n$ at an output terminal F, in which $$d_n=\sum_{i=0}^{2^{n-1}-1} c_1^{i_1} c_2^{i_2} \ldots c_{n-1}^{i_{n-1}} a_i$$

where the superscripts $i_1 i_2 \ldots i_{n-1}$ form the binary representation of $i$, and $c_j^0=\bar{c}_j$, $c_j^1=c_j$ in which $j=1,2, \ldots, n-1$.

12. In a circuit as set forth in claim 11 in which the total number of input terminals $p$ is $p=2^{n-1}+n-a1$.

13. A universal logic circuit as set forth in claim 11 in which said logic gates are arranged in modules, and which includes means connecting said modules in a series of successive levels, the last level of which includes a group of modules, each of which has a different plurality of said logic gates, the inputs of said logic gates in a group being connected to at least $C_{n-1}$ and $C_{n-2}$ terminals and a plurality of said A input terminals, different gates in each group being connected to different combinations of said input terminals $C_{n-1}$, $C_{n-2}$ and said plurality of A terminals.

14. A universal logic circuit as set forth in claim 11 in which said logic gates are arranged in modules, and which includes means connecting said modules in a series of successive levels, and means connecting the input to the modules in the last level to said input terminals $A_0, A_1, \ldots, A_{2^{n-1}-1}$ and to at least two of said input terminals $C_1, C_2, \ldots, C_{n-1}$.

15. A universal logic circuit as set forth in claim 14 in which each intermediate level includes at least one module having inputs connected in different combinations to the outputs of a module in a preceding level, and to at least two of said C input terminals.

16. A system as set forth in claim 14 in which the second level of said modules produce a plurality of residue functions $f_i$ of $n-k+1$ variables as inputs to said first level in which $k$ is the number of variables in the first level module, and which includes means for providing a check bit $b$ to check each of said functions $f_i$, and detector means responsive to said check bit and said function $f_i$ to detect a fault prior to said first level.

17. A system as set forth in claim 16 which includes means for providing a plurality of check bits $p_j$, the check bits with the residue function $f_i$ providing a parity check code, decoder means responsive to said parity check bits and said residue functions to correct each function $f_i$, and means connecting the output of said decoder means to said first level module 18. A universal logic circuit for providing the function for $n$ variables comprising input means including at least one 2 of input terminals $C_1, C_2, \ldots, C_{n-1}$ for providing input variables $c_1, c_2, \ldots, c_{n-1}$, a second group of separate input terminals $A_0, A_1, \ldots, A_{2^{n-1}-1}$ connected to provide different input variables $a_0, a_1 a_{2^{n-1}-1}$, a plurality of logic gates connected to be responsive to the inputs on said input terminals $C_1, C_2, \ldots, C_{n-1}$ and $A_0, A_1, \ldots, A_{2^{n-1}-1}$ to provide a function $e_n$ at an output terminals F, in which $$e_n=\sum_{i=0}^{2^{n-1}-1} c_1^{i_1} c_2^{i_2} \ldots c_{n-1}^{i_{n-1}} \bar{a}_i$$

where the superscripts $i_1 i_2 \ldots i_{n-1}$ form the binary representation of $i$, and $c_j^0=\bar{c}_j$, $c_j^1=c_j$ in which $j=1,2, \ldots, n-1$.

19. In a universal logic circuit, a first input path, a second input path, a third input path, and a fourth input path, a plurality of at least four separate additional input circuits providing four different input functions, a first logic gate having at least three inputs including means for connecting one of its inputs to said second input path, a second one of its inputs to said fourth input path and a third one of its inputs to one of said four separate input circuits; a second logic gate having three inputs including means for connecting one of its inputs to said second input path, a second one of its inputs to said third input path and a third one of its inputs to a second one of said four separate input circuits; a third logic gate having at least three inputs including means for connecting one of its inputs to said first input path, a second one of its inputs to said fourth input path and a third one of its inputs to a third one of said four separate input circuits; and a fourth gate having at least three inputs including means for connecting a first one of its inputs to said first input path, a second one of its inputs to said third input path, and a third one of its inputs to the fourth one of said four separate input circuits.

20. A circuit as set forth in claim 19 in which said first, second, third and fourth paths are connected to provide $x_1$, $\bar{x}_1$, $x_2$, $\bar{x}_2$ variable signals to the circuit, and said four separate input circuits are connected to provide four different residue functions.

21. In a universal logic circuit for providing the function for $n$ variables comprising a first input path for providing one variable $x_1$, a second input path for providing a second variable $\bar{x}_1$, a third input path for providing a third variable $x_2$ and a fourth input path for providing a fourth variable $\bar{x}_2$, a plurality of four separate input circuits providing a plurality of four different input functions, a first logic gate having at least three inputs including means for connecting a first one of its inputs to said $\bar{x}_1$ path, a second one of its inputs to said $\bar{x}_2$ path and a third one of its inputs to one of said four separate input circuits, a second logic gate having three inputs including means for connecting a first one of its inputs to said $\bar{x}_1$ input path, a second one of its inputs to said $x_2$ input path and its third input to a second one of said four separate input circuits, a third logic gate having at least three inputs including means for connecting a first one of its inputs to said $x_1$ input path, a second one of its inputs to said $\bar{x}_2$ input path, and a third one of its inputs to a third one of said four separate input circuits, and a fourth gate having at least three inputs including means for connecting a first one of its inputs to said $x_1$ input path, a second one of its inputs to said $x_2$ input path, and its third input to the remaining one of said four separate input circuits.